United States Patent [19]

Snyder et al.

[11] 4,058,405

[45] Nov. 15, 1977

[54] PUMPABLE CEMENT GROUT AND ADDITIVE

[75] Inventors: Joseph T. Snyder, Northfield; Richard E. Huffman, Cleveland Heights, both of Ohio

[73] Assignee: Grout Supply Company, Richfield, Ohio

[21] Appl. No.: 703,940

[22] Filed: July 9, 1976

[51] Int. Cl.² ................................................ C04B 7/35
[52] U.S. Cl. ........................................ 106/87; 106/93; 106/98
[58] Field of Search ............................. 106/93, 98, 87

[56] References Cited

U.S. PATENT DOCUMENTS

| | | | |
|---|---|---|---|
| 3,762,937 | 10/1973 | Schupack | 106/93 |
| 3,972,723 | 8/1976 | Balle et al. | 106/98 |

Primary Examiner—J. Poer

Attorney, Agent, or Firm—Baldwin, Egan, Walling & Fetzer

[57] ABSTRACT

A pumpable cement grout or mortar is described having improved early compressive strength, controllable set times, and desirable expansion properties which consist essentially of cement, sand, sodium chloride, aluminum powder and water. The grout or mortar also may contain one or more dispersing agents, thickeners, and an inert filler. It has been found that the workability of cement grout or mortar compositions containing the above ingredients does not depend necessarily upon the amount of water only as in prior art cements, and the cements of the invention exhibit reduced segregation, bleeding and shrinking tendencies resulting in higher strengths and increased durability. A process for preparing the cement compositions of the invention also is described.

8 Claims, No Drawings

PUMPABLE CEMENT GROUT AND ADDITIVE

BACKGROUND OF THE INVENTION

This invention relates to pumpable cement grouts or mortar compositions and a process for their manufacture. More particularly, this invention relates to improvements in cement grouts or mortars which contain additives which improve the workability while reducing the tendency of the cement to segregate, bleed or shrink before hardening.

In the use of pumpable grouts or cements, invariably, a cement factor of upwards of eight sacks per cubic yard is used. In preparing such pumpable cements or grouts, it is desirable to disperse the cement particles thoroughly, reduce water requirement while increasing fluidity, reduce bleeding and segregation and control expansion and/or reduce setting shrinkage. Attempts to improve cement grouts or mortars generally have been directed to improving pumpability, penetration, strength, durability and bonding to reinforcing steel.

Additives have been suggested in the prior art for improving the desirable properties of cement grouts and mortars. Calcium chloride has been suggested and has been demonstrated to provide high early strengths. However, calcium chloride has exhibited a tendency to reduce expansion excessively, particularly when used in combination with aluminum powder which previously has been described as an additive for cement grouts. Sodium chloride has been suggested as an accelerator for high water, low strength cements and bituminous-containing grouts.

SUMMARY OF THE INVENTION

The present invention comprises a pumpable cement grout which provides a high early strength without detrimental effect on expansion. The present invention also provides a method of preparing the cement grout or mortar and an additive composition for addition to cement/sand/water mixes to improve the desirable properties of such mixes. The cement compositions of the invention comprise cement, sand, water, aluminum powder, sodium chloride and optionally, dispersing agents, thickeners, and solid fillers such as limestone powder.

DESCRIPTION OF THE PREFERRED EMBODIMENTS

The improved cement grout or mortar compositions of the invention comprise cement, sand, water, aluminum powder, sodium chloride, and optionally, dispersing agents, thickeners and limestone. In general, the grout will consist essentially of 100 parts by weight of cement, from about 100 to 300 parts of sand, from about 1 to 5 parts of sodium chloride, from about 0.006 to 0.03 parts of aluminum powder, from zero to about one part of a solid filler, from zero to about 0.05 parts of a thickener and from zero to 0.5 parts of a dispersing agent. The cement grouts or mortars of the invention preferably are prepared by preparing a first mixture comprising about 100 parts of cement, from about 100 to 300 parts of sand, and from about 40 to 70 parts of water, a second mixture comprising sodium chloride, aluminum powder, a thickener, a dispersing agent and solid filler such as limestone powder, and adding said second mixture to the first mixture to provide a mortar containing, per 100 parts of cement, from about one to five parts of sodium chloride, from about 0.006 to about 0.03 parts of aluminum powder, from zero to about 1 part of solid filler, from zero to 0.05 parts of the thickener, and from about zero to about 0.5 parts of the dispersing agent. Mortars of the type prepared in this manner exhibit improved high early strengths, controllable set times and improved expansion characteristics. Such grouts may be utilized in pressure grouting, soil stabilization, mine shaft and drift grouting, tunnel grouting, grout curtains, water seals, augered piles, augered tie-backs, grouting of post-tension cable conduits and ducts and in structural concrete repairs.

The thickeners which may be utililized in the present invention include polyvinyl alcohol, carboxymethylcellulose, starch, gelatine, and mixtures thereof. The dispersing agents utilized in the invention may be one or more of the well-known dispersing agents or surface active agents such as the alkaline salts of sulfonated fatty alcohols, salts of sulfonic hydrocarbon and fatty acids, carbohydrate salts, hydroxylated polycarboxylic acids and salts thereof, and non-ionic agents such as ethylene oxide condensation products including polyoxyethylene alkyl ethers, polyoxyethylene alkyl phenol ethers, sorbitan aliphatic acid esters, etc. Although the precise function of such dispersants in the concrete mortar and grout compositions of the invention is not completely understood, the inclusion of dispersing agents does affect the water-to-cement ratios, possibly by improving the dispersion of the cement particles in the mixture. The solid fillers may be any of the materials usually used in cement such as limestone, calcium hydroxide, silica dust, fly ash, etc.

The following examples illustrate the preparation of the additive compositions of this invention which are particularly useful when added to grout compositions containing cement, sand and water. The compositions are dry powders and the order of mixing is not critical.

| Additive Composition A | Parts by Weight |
|---|---|
| Aluminum powder | 0.03 |
| Calcium lignosulfonate | 0.40 |
| Carboxymethylcellulose | 0.04 |
| Limestone powder | 0.53 |
| Sodium chloride | 4.00 |

| Additive Composition B | Parts by Weight |
|---|---|
| Aluminum powder | 0.006 |
| Polyvinyl alcohol | 0.004 |
| Calcium lignosulfonate | 0.08 |
| Sodium chloride | 0.8 |

| Additive Composition C | Parts by Weight |
|---|---|
| Aluminum powder | 0.003 |
| Sodium chloride | 1.0 |
| Dispersing agent from reaction of nonyl phenol with about 15 moles of ethylene oxide | 0.2 |
| Polyvinyl alcohol | 0.04 |

| Additive Composition D | Parts by Weight |
|---|---|
| Aluminum powder | 0.006 |
| Calcium lignosulfonate | 0.08 |
| Carboxymethylcellulose | 0.04 |
| Silica powder | 0.11 |
| Sodium chloride | 0.08 |

| Additive Composition E | Parts by Weight |
|---|---|
| Aluminum powder | 0.09 |
| Dispersing agent of Composition C | 0.1 |
| Starch | 0.005 |
| Limestone powder | 0.25 |
| Sodium chloride | 0.8 |

The cement mortar or grout compositions of the invention are prepared by incorporating the additive compositions of the type illustrated above into a cement/sand/water mixture. The incorporation of the additive compositions to the cement mixtures results in improved dispersion of the cement particles, reduced water requirements, increased fluidity, reduced bleeding, settlement, separation of mix and controlled expansion. The amout of additive composition incorporated into the cement mixture may vary in accordance with the amount of the various ingredients in the additive compositions, and the amount of the various ingredients desired in the final cement grout composition.

The following examples are illustrative of the cement compositions of the invention. These compositions utilize a Portland Type I cement.

| Cement Composition 1 | Parts by Weight |
|---|---|
| Portland cement (Bessemer) | 100.0 |
| Sand | 200.0 |
| Water | 50.0 |
| Additive Composition A | 0.5 |

| Cement Composition 2 | Parts by Weight |
|---|---|
| Portland cement (Atlas) | 100.0 |
| Sand | 220.0 |
| Water | 63.0 |
| Additive Composition A | 0.5 |

| Cement Composition 3 | Parts by Weight |
|---|---|
| Portland Cement (Atlas) | 100.0 |
| Sand | 150.0 |
| Water | 50.0 |
| Additive Composition E | 3.0 |

| Cement Composition 4 | Parts by Weight |
|---|---|
| Portland Cement (Huron) | 100.0 |
| Sand | 250.0 |
| Water | 60.0 |
| Additive Composition B | 2.5 |

| Cement Composition 5 | Parts by Weight |
|---|---|
| Portland Cement (Atlas) | 100.0 |
| Sand | 200.0 |
| Water | 55.0 |
| Additive Composition C | 2.5 |

The improvement in the properties exhibited by the cement grouts of the invention is shown in the following table. A comparison with properties of a similar cement composition except for the substitution of calcium chloride for the sodium chloride illustrates the improvements.

TABLE

| Cement Composition | %Expansion | | Compressive Strength (PSI) | | |
|---|---|---|---|---|---|
| | 30 Min. | 2 Hours | 1 Day | 3 Days | 7 Days |
| 2 | 8.0 | 10.5 | 1700 | 3700 | 4500 |
| Similar to 2 but calcium chloride in lieu of sodium chloride | 0.0 | 1.6 | 1400 | 2800 | 3900 |

The embodiments of the invention in which an exclusive property or privilege is claimed are defined as follows:

1. A pumpable cement grout or mortar having improved early compressive strength consisting essentially of 100 parts by weight of cement, from about 100 to 300 parts of sand, from about one to five parts by weight of sodium chloride, from about 0.006 to 0.03 parts of aluminum powder, and water.

2. The mortar of claim 1 wherein the mortar also contains up to about 1 part of a solid filler and up to about 0.05 parts of a thickener.

3. The mortar of claim 1 containing from about 40 to about 70 parts of water and from about 0.5 parts of a dispersing agent.

4. The mortar of claim 3 wherein the dispersing agent is a salt of a lignosulfonic acid.

5. A pumpable mortar having improved early compressive strength consisting essentially of 100 parts by weight of cement, from about 100 to 300 parts by weight of sand, from about 1 to 5 parts by weight of sodium chloride, from about 0.006 to about 0.03 parts of aluminum powder, from about 40 to 60 parts by weight of water, from about zero to 1 part by weight of solid filler, from about zero to about 0.5 parts of a thickener and from about zero to about 0.5 parts of a thickener.

6. The mortar of claim 5 wherein the thickener is methyl cellulose and the dispersing agent is a salt of a lignosulfonic acid.

7. A method of preparing a pumpable mortar having improved early compressive strength comprising the steps of
   a. preparing a first mixture comprising about 100 parts of cement, from about 100 to 300 parts of sand, from about 40 to 70 parts of water,
   b. preparing a second mixture comprising sodium chloride, aluminum powder, solid filler, a thickener and a dispersing agent, and
   c. adding said second mixture to the first mixture to provide a mortar containing, per 100 parts of cement, from about 1 to 5 parts of sodium chloride, from about 0.006 to about 0.03 parts of aluminum powder, up to about 1 part of solid filler, up to about 0.05 parts of the thickener and up to about 0.5 parts of the dispersing agent.

8. An additive composition for improving the initial compressive strength of pumpable mortars consisting essentially of from about 0.5 to about five parts of sodium chloride, from about 0.006 to about 0.012 parts of aluminum powder, from about 0.001 to about 0.05 parts of a thickener, from about 0.05 to about 0.1 parts of a dispersing agent, and 0.01 to about 0.5 parts of limestone powder.

* * * * *